(12) United States Patent
Friedrich

(10) Patent No.: US 6,466,362 B1
(45) Date of Patent: Oct. 15, 2002

(54) HYBRID AMPLIFIER AND CONTROL METHOD HEREFOR THAT MINIMIZES A NOISE FIGURE FOR PARTICULAR SPAN LOSS

(75) Inventor: Lars Friedrich, Glen Burnie, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 09/651,840

(22) Filed: Aug. 31, 2000

(51) Int. Cl.[7] .................................................. H01S 3/30
(52) U.S. Cl. ...................... 359/334; 359/341.1; 359/337
(58) Field of Search ........................ 359/341.41, 341.42, 359/334, 337, 337.4

(56) References Cited

U.S. PATENT DOCUMENTS

| | | | | |
|---|---|---|---|---|
| 5,900,969 A | * | 5/1999 | Srivastava et al. | 359/161 |
| 6,049,413 A | * | 4/2000 | Taylor et al. | 359/337 |
| 6,064,501 A | * | 5/2000 | Roberts et al. | 359/110 |
| 6,091,539 A | * | 7/2000 | Kosaka | 359/124 |
| 6,185,025 B1 | * | 2/2001 | Blown et al. | 359/188 |
| 6,236,487 B1 | * | 5/2001 | Stephens | 359/124 |
| 6,313,940 B1 | * | 11/2001 | Bode et al. | 359/117 |
| 6,323,993 B1 | * | 11/2001 | Hansen et al. | 359/337 |

OTHER PUBLICATIONS

Masuda et al. ECOC '98, Sep. 20–24, 1998.*
Masuda et al. Electronic Letts. Mar. 4, 1999 vol. 35 No. 5.*
Masuda et al. Electronic Letts. Jun. 25, 1998 vol. 34 No. 13.*
Masuda. OFCC. Mar. 7–10, 2000.*
Masuda, H.; Suzuki K.I.; and Aida, K. "Ultra-wideband optical amplification with 3 dB bandwidth of 65nm using a gain-equalised two-stage erbium-doped fibre amplifier and Raman amplification." Apr. 24, 1997. Electronic Letters. vol. 3 No. 9 pp. 753–754.*

* cited by examiner

Primary Examiner—Thomas H. Tarcza
Assistant Examiner—Stephen Cunningham
(74) Attorney, Agent, or Firm—Michael R. Cammarata

(57) ABSTRACT

A hybrid amplifier reduces the noise generated by the hybrid amplifier. The hybrid amplifier includes a rare-earth doped fiber amplifier such as an EDFA (erbium-doped fiber amp), a Raman amplifier, a controller and a memory device. Noise is reduced by determining a gain balance between the EDFA and Raman amp that minimizes the noise figure. The controller performs a method that generates a plurality of functions relating the hybrid amp noise figure and the Raman gain for a particular span loss. These functions are then utilized to determine the Raman gain portion of the gain balance that minimizes the noise figure. The remaining portion of the gain balance is made up by the EDFA. For a hybrid amplifier that will see only one span loss value, then only one such function needs to be generated. Furthermore, the memory device of the hybrid amplifier can be programmed to store an optimum control curve that minimizes the noise figure for one or a plurality of span losses.

13 Claims, 8 Drawing Sheets

HYBRID AMPLIFIER AND CONTROL METHOD HEREFOR THAT MINIMIZES A NOISE FIGURE FOR PARTICULAR SPAN LOSS

BACKGROUND OF THE INVENTION

The invention relates to hybrid amplifiers for optical communication systems. More particularly, the invention relates to minimizing the noise figure of a hybrid amplifier that hybridizes Raman and rare-earth doped amplifier components.

Hybrid amplifiers are conventional elements in modern optical communication systems. A hybrid amplifier may combine or hybridize a rare-earth doped fiber amplifier such as an EDFA (erbium doped fiber amplifier) and a distributed amplifier such as a Raman amplifier. Such hybrid amplifiers are typically designed for optimum performance at a specific fiber or span loss (e.g. designed for 20 or 25 dB loss).

As is also known in the art, the maximum distance an optical signal can travel on a segment (span) of optical fiber depends, among other things, on the noise performance of the amplifier boosting the signal. A noisy amplifier can bury the signal (reduce the signal-to-noise ratio) or otherwise make the signal indistinguishable from the noise particularly as the signal is attenuated across the span.

The noise performance may be quantified as a noise figure which is expressed in dB. An amplifier with a lower noise figure translates into a longer reach for the optical communications system.

Extending the reach or maximum transmission distance at which the signal can be reliably recovered is an important goal in optical communication systems. Therefore, a need exists for a hybrid amplifier with a minimized noise figure.

SUMMARY OF THE INVENTION

The invention is a strategy that combines Raman and EDFA amplifiers in such as way as to minimize the amplifier noise figure for the total hybrid amp. By minimizing the noise figure, the invention also permits an optical signal to be transmitted a longer distance and still have a sufficient signal-to-noise ratio so as to be recoverable.

The invention achieves this goal by determining a gain balance between the Raman amplifier and the EDFA that minimizes the noise figure for a particular span loss. In other words, the invention determines how much gain should be applied by the Raman amplifier and how much gain should be applied by the EDFA that would generate the minimum amount of Amplified Spontaneous Emission (ASE) noise for the hybrid amplifier.

A hybrid amplifier according to the invention includes a rare-earth doped fiber amplifier operatively connected to a span of optical fiber; a Raman pump operatively connected to the span of optical fiber and operating at a wavelength selected to provide Raman gain to an optical signal travelling in the span of optical fiber; and a controller operatively connected to the rare-earth doped fiber amplifier and said Raman pump; the controller controlling the Raman pump to provide a Raman gain value that minimizes a noise figure of the hybrid amplifier for a span loss of the span of optical fiber to which the Raman pump and the rare-earth doped fiber amplifier are operatively connected; and the controller controlling the rare-earth doped fiber amplifier to amplify the optical signal in accordance with the Raman gain value.

Furthermore, the controller may control the rare-earth doped fiber amplifier to amplify the optical signal at a gain value related to the difference between the span loss and the Raman gain value.

Still further, the rare-earth doped fiber amplifier may be an EDFA.

The invention also includes a method of minimizing noise generated by a hybrid amplifier having a rare-earth doped fiber amplifier and a Raman amplifier, including: generating a plurality of functions, each function relating a noise figure of the hybrid amplifier and a Raman gain of the Raman amplifier for a particular span loss; selecting a span loss value from among the particular span losses; determining a Raman gain value that minimizes the noise figure of the hybrid amplifier from the function corresponding to the selected span loss value; controlling the Raman amplifier to amplify an optical signal at the determined Raman gain value; and controlling the rare-earth doped fiber amplifier to amplify the optical signal in accordance with the Raman gain value.

If only one span loss is contemplated, then the invention may include a method of minimizing noise generated by a hybrid amplifier having a rare-earth doped fiber amplifier and a Raman amplifier, including: generating a function relating a noise figure of the hybrid amplifier and a Raman gain of the Raman amplifier for a span loss of the span of optical fiber to which the Raman amplifier and the rare-earth doped fiber amplifier are operatively connected; determining a Raman gain value that minimizes the noise figure of the hybrid amplifier from the generated function; controlling the Raman amplifier to amplify an optical signal at the determined Raman gain value; and controlling the rare-earth doped fiber amplifier to amplify the optical signal in accordance with the Raman gain value.

The invention may also include setting the rare-earth doped fiber amplifier gain to a value related to the difference between the selected (or single) span loss value and the determined Raman gain value.

A hybrid amplifier according to the invention may include a rare-earth doped fiber amplifier such as an EDFA operatively connected to a span of optical fiber; a Raman pump operatively connected to the span of optical fiber and operating at a wavelength selected to provide Raman gain to an optical signal travelling in the span of optical fiber; a controller operatively connected to the rare-earth doped fiber amplifier and the Raman pump; a memory device storing a Raman gain value and a rare-earth doped amplifier gain value that minimizes a noise figure of the hybrid amplifier for a span loss of the span of optical fiber to which the Raman pump and the rare-earth doped fiber amplifier are operatively connected; the controller controlling the Raman pump to provide Raman gain substantially equal to the Raman gain value stored by the memory device; and the controller controlling the rare-earth doped fiber amplifier to provide gain substantially equal to the rare-earth doped amplifier gain value stored by the memory device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
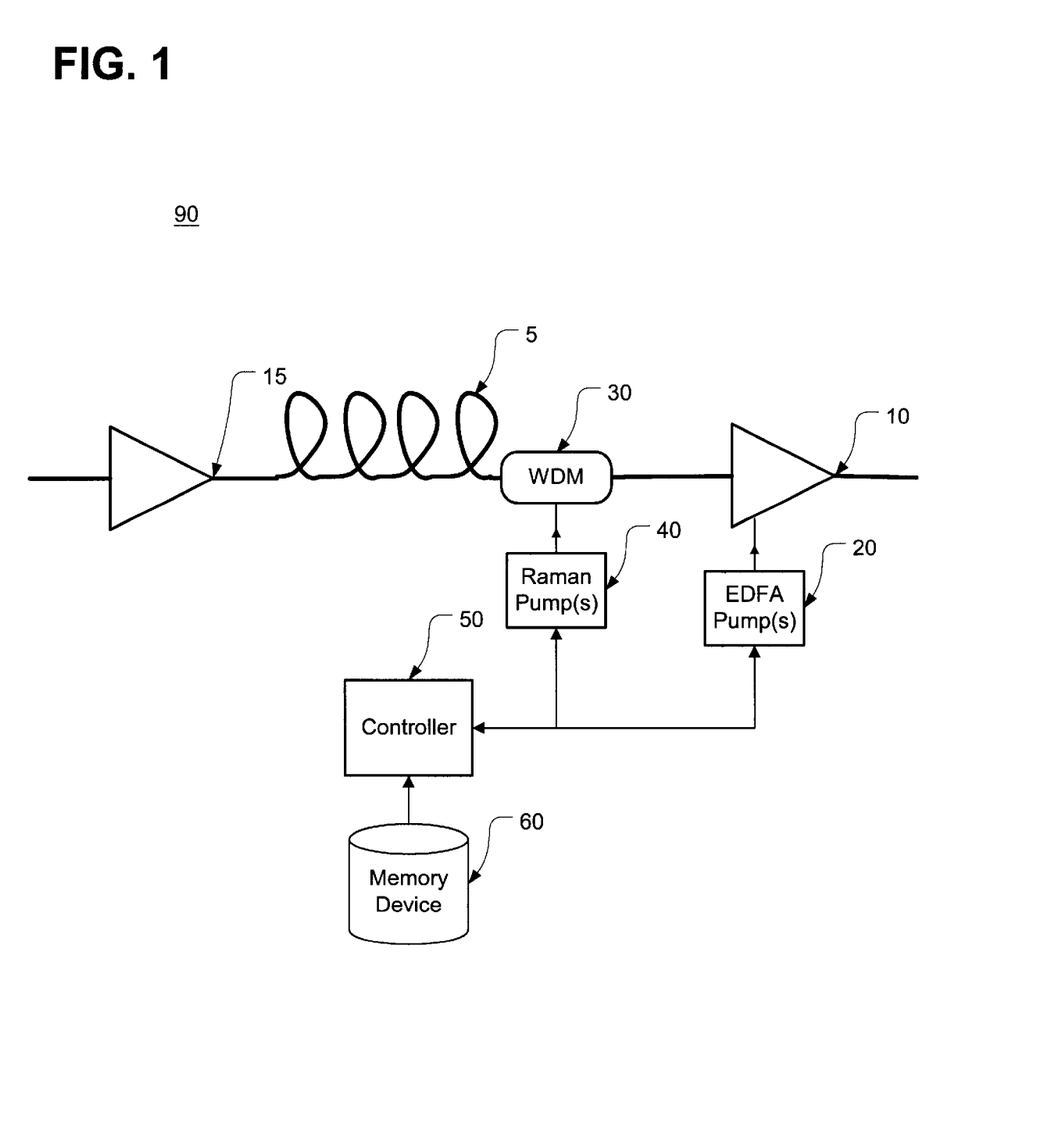
FIG. 1 is a block diagram of a hybrid amplifier according to the invention in which the Raman amplifier component is operating in a backpropagating mode.

FIG. 1 illustrates a hybrid amplifier 90 in which a span of optical fiber 5 is amplified by a rare-earth doped fiber amplifier and a Raman amplifier.

The rare-earth doped fiber amplifier shown in FIG. 1 is an EDFA (erbium doped fiber amplifier) that includes EDFA 10 and EDFA pump(s) 20. It is to be understood that EDFA 10 is just one, non-limiting example of a rare-earth doped fiber amplifier and that other types of such amplifiers can be used to construct a hybrid amp 90 consistent with the invention. It is also to be understood that EDFA pump(s) 20 may include one or a plurality of pumping lasers operating at one or more pumping wavelengths as is known in the art.

FIG. 1 also illustrates the typical practice of using a chain of amplifiers to amplify a long fiber span. The EDFAs 10 and 15 are an example of such a chain of amplifiers.

The Raman amplifier shown in FIG. 1 includes Raman pump(s) 40 that pump fiber span 5 with a wavelength selected to provide Raman amplification to an optical signal propagating in fiber span 5. The Raman pump(s) 40 may include a single or multiple pumping lasers operating at one or more pumping wavelengths.

Raman pump(s) 40 are connected to the fiber span 5 via a wavelength division multiplexer (WDM) 30. The WDM 30 is a conventional element that is also referred to as a wavelength selective coupler. WDM 30 may be constructed with various devices to permit the signal light and pumping light to pass transparently therethrough. The Raman pump 40 emits light at a wavelength different than the signal light. The wavelength selective coupler or WDM 30 is frequency or wavelength selective in that it will route the pumping light onto fiber span 5 and prevent signal light from being fed to the Raman pump 40.

For example, WDM 30 may be a wavelength division multiplexer using a Bragg filter or Fabry-Perot interferometer. WDM 30 may also be made from dielectric coatings, a thin-film filter, or arrayed waveguides.

The Raman amp configuration shown in FIG. 1 operates in a counterpropagating mode in which the pumping light propagates in a direction counter or opposite to direction in which the signal light propagates.

Figure 2:
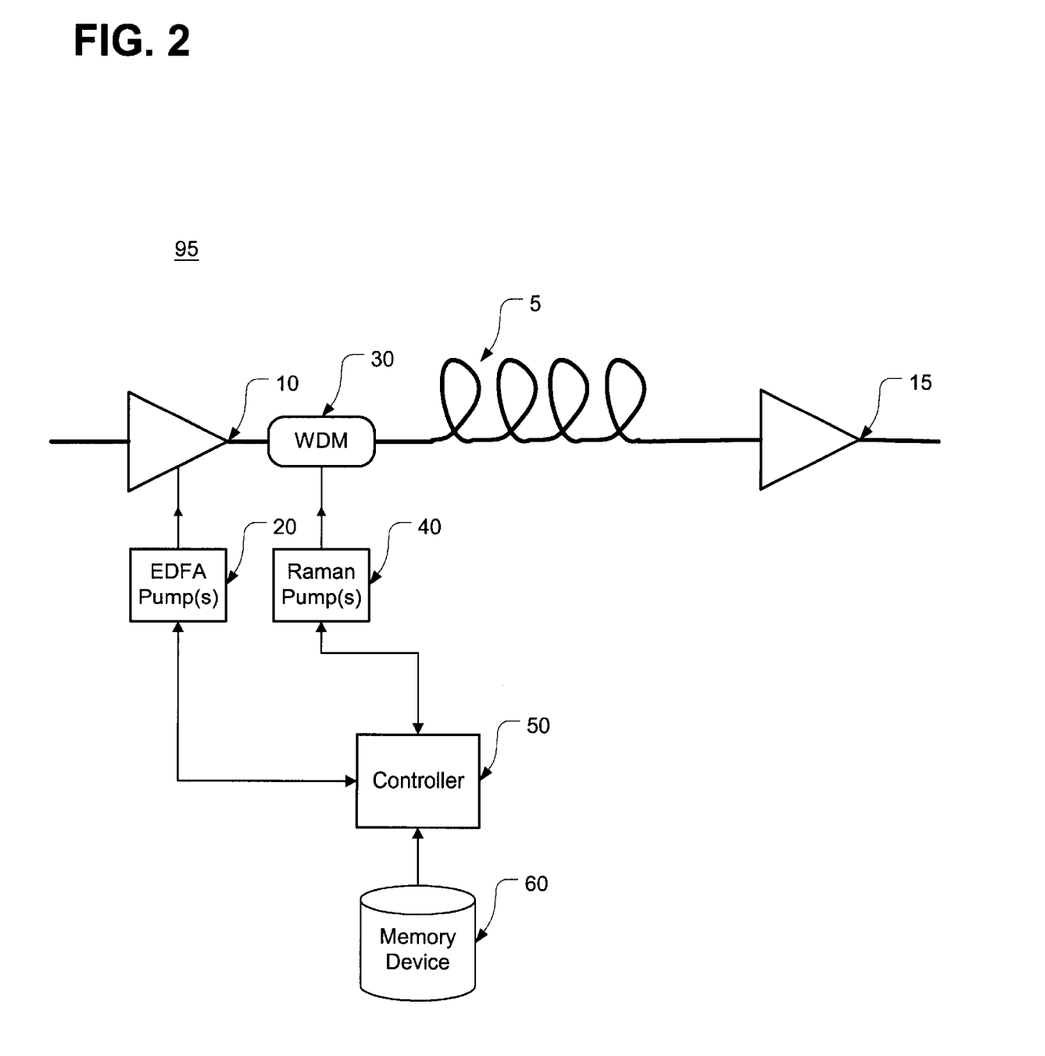
FIG. 2 is a block diagram of a hybrid amplifier according to the invention in which the Raman amplifier component is operating in a copropagating mode.

FIG. 2 shows an alternative hybrid amp 95 in which the Raman amp operates in the copropagating mode in which the pumping light propagates in the same direction in which the signal light propagates. The EDFA 10 and EDFA pump (s) 20 are part of the hybrid amp 95 and EDFA 15 is shown merely to illustrate a chain of amps. The hybrid amp 95 of FIG. 2 is otherwise quite similar to the hybrid amp 90 of FIG. 1.

As further shown in FIGS. 1 and 2, a controller 50 is connected to the EDFA pump(s) 20, the Raman pump(s) 40, and memory device 60. The term "connection" as used herein is a relative term and does not require a direct physical connection. This is particularly true in relation to the controller 50 which may need to communicate with physically distant components such as the EDFA and Raman pumps 20, 40 shown in FIG. 1. Furthermore, the memory device 60 may also be physically distant from controller 50 thus making a direct connection impractical.

For example, controller 70 may communicate with these elements by using a communication pathway over fiber span 5 or via an Internet or wireless communication pathway. Such alternative communication pathways may be convenient in view of the physically distinct locations that may be provided for the various elements.

Controller 50 may be constructed in a variety of fashions utilizing electronic components, optical components, computer hardware, firmware, software or a combination thereof. Controller 50 may also utilize processing resources of an existing controller such as a network element controller, terminal controller, or network managing controller.

Memory device 50 may also be constructed in a variety of fashions including the on-chip memory of a microprocessor and/or external memory devices. The memory requirements of the invention are rather low and, therefore, the size of the memory device 50 would not have to be very large.

Operation of The Invention

In general, the invention operates by generating functions relating the hybrid amplifier noise figure and the Raman amp gain where each function is for a particular span loss value. The function corresponding to a particular span loss is selected and a Raman gain value that minimizes the noise figure can then be determined from the selected function. In this way, a gain balance between the Raman and EDFA amps that produces a minimum amount of Amplified Spontaneous Emission (ASE) noise can be achieved.

If only one span loss is contemplated, then the invention need only generate one function for that particular span loss.

The controller 50 is responsible for executing the inventive methodologies. By performing the inventive methods, controller 50 may generate appropriate control signals or by accessing pre-stored control set points stored in memory device 60 to control the output power level or gain of the EDFA pump(s) 20 and Raman pump(s) 40 and thereby minimize the noise figure of the hybrid amp (90 or 95).

Figure 3:
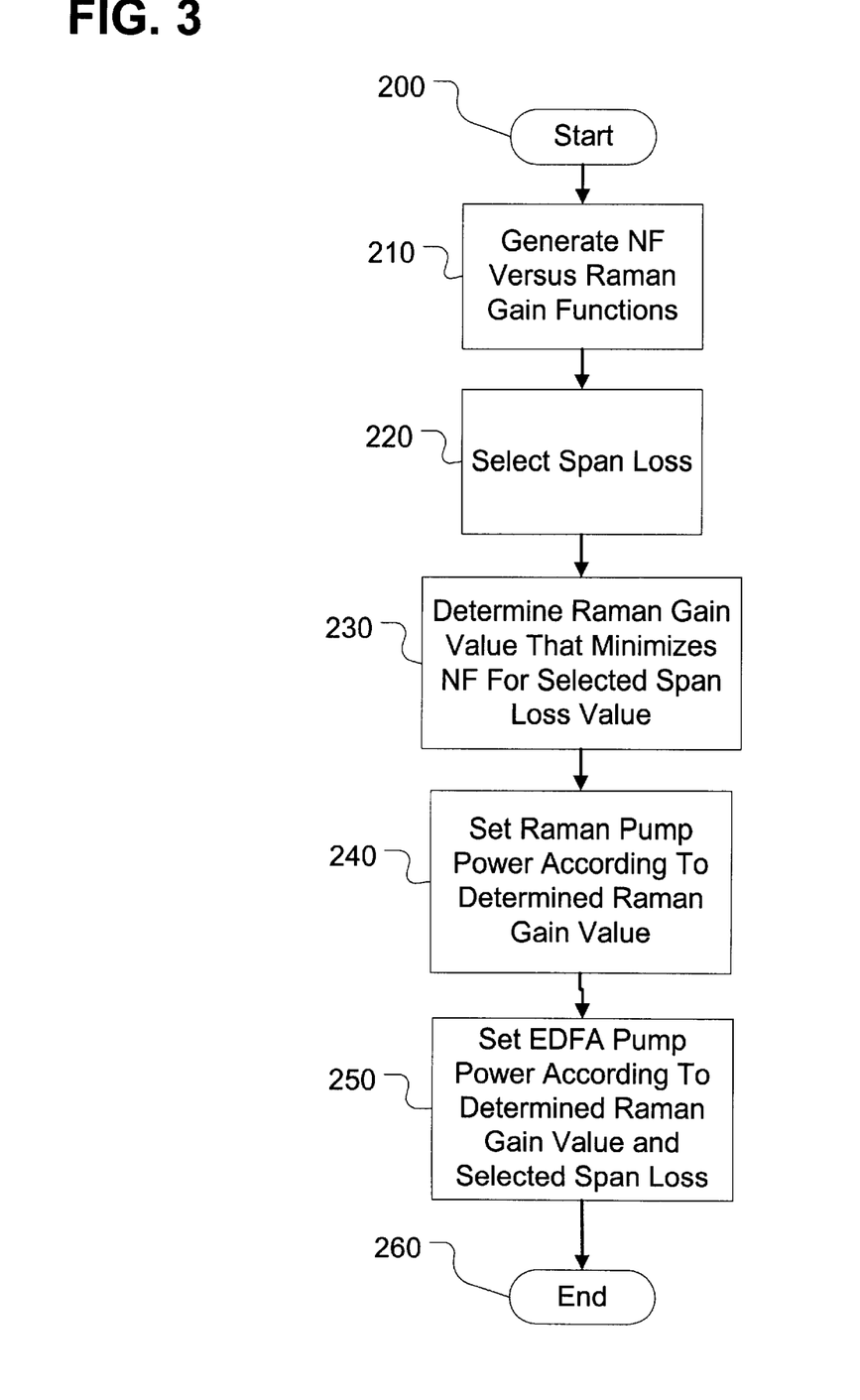
FIG. 3 is a high-level flowchart illustrating a method of operating a hybrid amplifier according to the invention.
Figure 5:
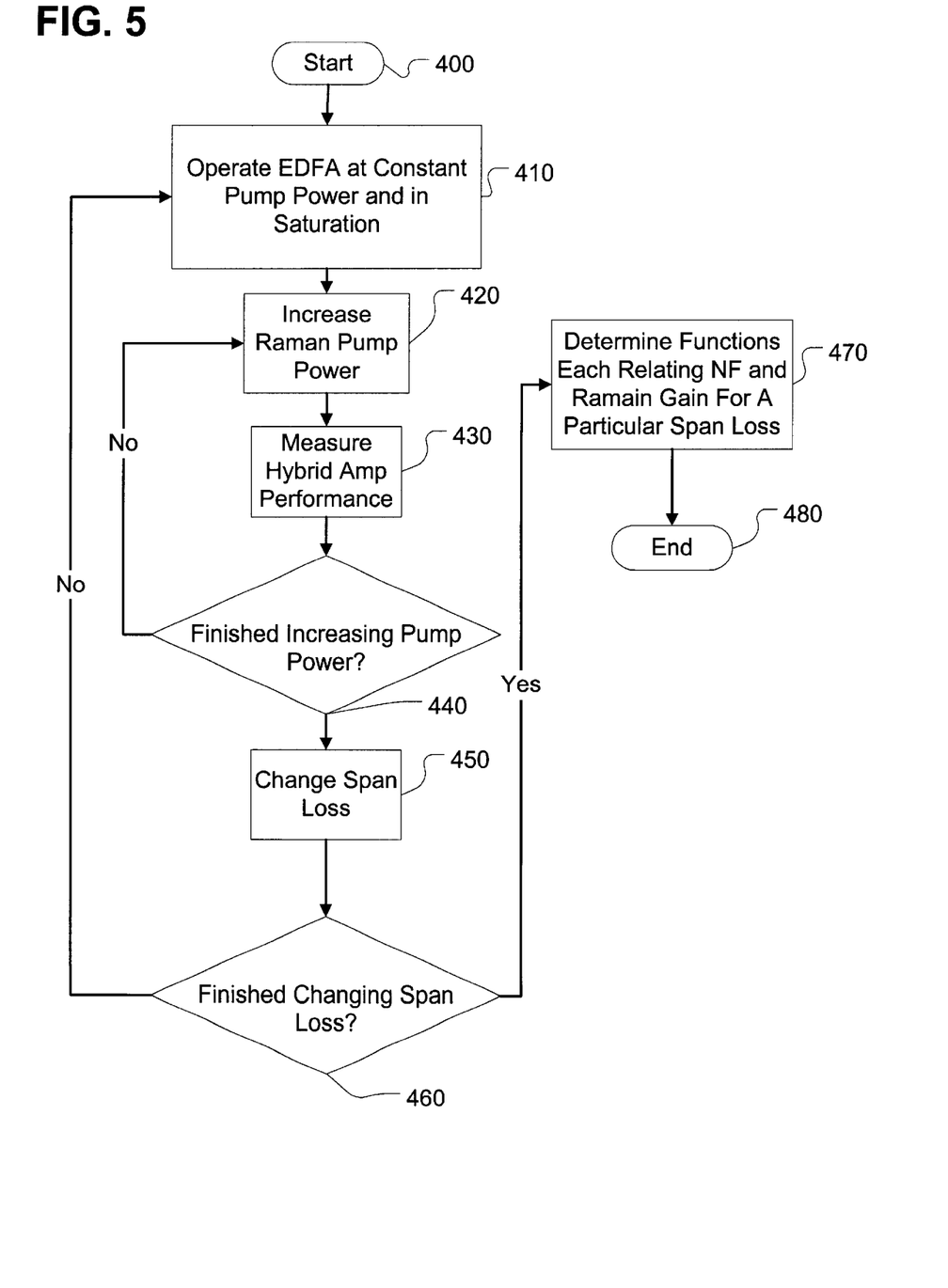
FIG. 5 is a lower-level flowchart illustrating how the functions utilized by the controller are generated according to the invention.

FIG. 3 is an example of a formalized control methodology according to the invention. As shown therein, the method starts (200) and then generates (210) functions relating the noise figure of the hybrid amp (90 or 95) and the Raman gain. As further explained below in detail, FIG. 5 illustrates one way of generating these functions. These functions may be stored by controller 50 in memory device 60.

Figure 6:
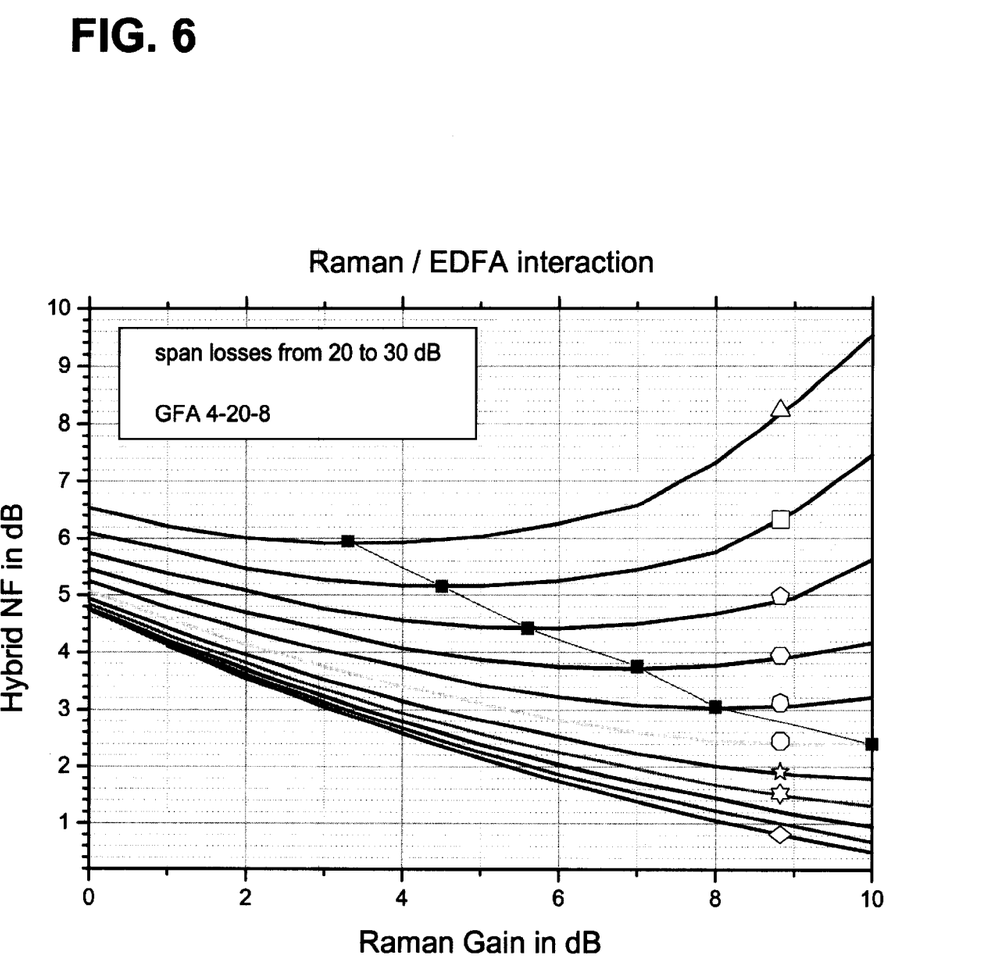
FIG. 6 is a graph of functions generated by the invention relating a hybrid amplifier noise figure and Raman gain for a 20 dB EDFA and a 10 dB Raman amplifier.
Figure 7:
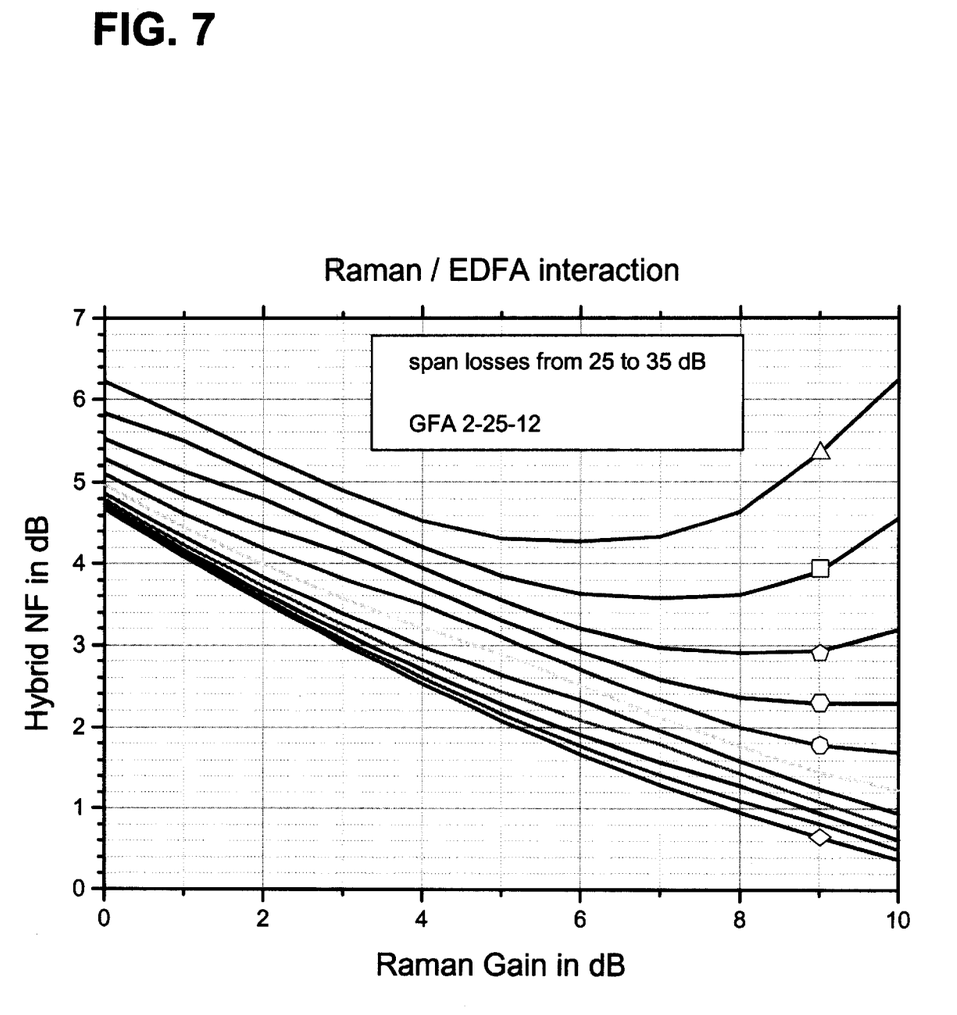
FIG. 7 is a graph of functions generated by the invention relating a hybrid amplifier noise figure and Raman gain for a 25 dB EDFA and a 10 dB Raman amplifier.
Figure 8:
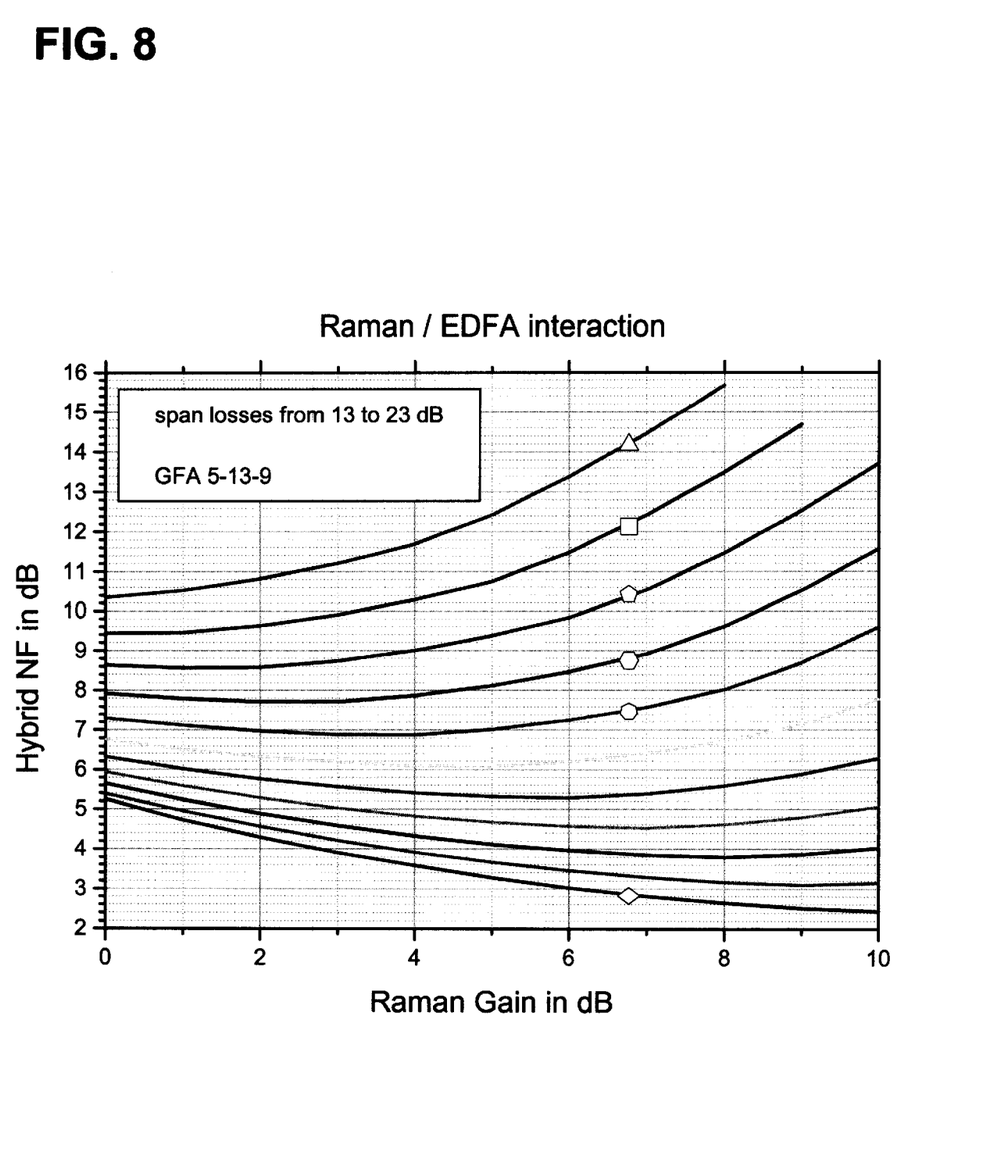
FIG. 8 is a graph of functions generated by the invention relating a hybrid amplifier noise figure and Raman gain for a 13 dB EDFA and a 10 dB Raman amplifier.

FIGS. 6–8 are examples of the functions generated by the invention and will be described below in detail.

The method of FIG. 3 then proceeds by selecting the span loss (220). This selection (220) may be performed by a user input device (not shown) or by referring to a selection value stored in memory device 60.

The method may then determine (230) the Raman gain value that minimizes the noise figure of the hybrid amp (90 or 95) for the selected span loss value. Taking FIG. 6 as an example, one of the functions (e.g. the function labeled by a square) stored in memory device 60 is selected (220). The function labeled by a square corresponds to a 21 dB span loss and the minimum NF (noise figure) value for this function occurs at approximately 4.5 dB of Raman gain. In other words, the gain balance between the Raman and EDFA amps is 4.5 dB Raman gain and (21 dB–4.5 dB)=16.5 dB EDFA gain.

Determining (230) the Raman gain value that minimizes the selected function may be performed in a variety of ways. If the function is stored in analytic form, then a derivative of the function may be calculated and set to zero (e.g. dNF/dRg=0, where NF is the noise figure and Rg is the Raman gain). If the function is represented by a collection of data points, then the controller 50 may also examine the data points and determine the minimum value directly. The minimum value thus determined may then be stored in memory device 60.

Once the minimum value of the selected function is determined (230), controller 50 may then set (240) the Raman pump 40 power to generate Raman gain corresponding to the minimum noise figure. Preferably, Raman gain is maintained spectrally constant (flat).

Continuing the FIG. 6 example above controller 50 would set the Raman pump 40 gain to 4.5 dB. To achieve the target gain of 21 dB for the selected span, controller finds the difference between the target gain and the Raman gain (21 dB–4.5 dB)=16.5 dB EDFA gain and sets (250) the EDFA pump 20 output power to produce 16.5 dB of gain. The method is then complete as indicated by the end step (260). Of course, the controller 50 may set the output powers to approximate gain values instead of exact gain values.

Figure 4:
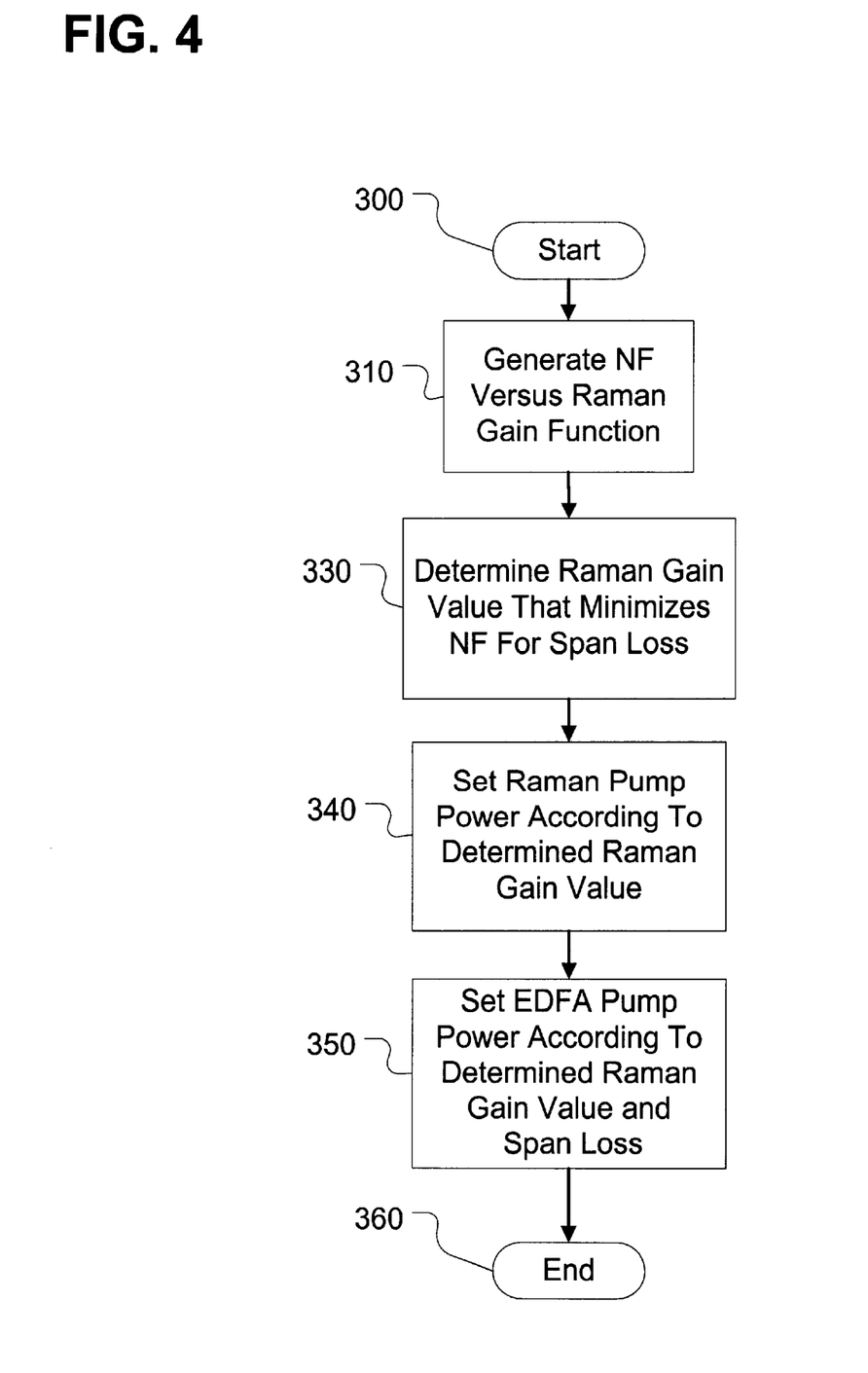
FIG. 4 is another high-level flowchart illustrating a method of operating a hybrid amplifier according to the invention.

FIG. 4 illustrates an alternative method of controlling a hybrid amplifier (90 or 95). The method of FIG. 4 is quite similar to the method of FIG. 3 with the main difference being the elimination of the select span loss step (220). This is because the FIG. 4 method is intended for a hybrid amplifier (90 or 95) amplifying a particular or otherwise known span loss. Thus, it would be unnecessary to generate (210) a plurality of functions corresponding to a plurality of span losses or to select (220) one of the functions for a particular span loss.

As shown in FIG. 4, the alternative method starts (300) and then generates (310) a single function relating the noise figure of the hybrid amp (90 or 95) and the Raman gain for a particular span loss. As further explained below in detail, FIG. 5 illustrates one way of generating this function.

The method may then determine (330) the Raman gain value that minimizes the noise figure of the hybrid amp (90 or 95) for the particular span loss. Although FIG. 6 shows a plurality of functions, it is a simple matter to imagine the generation and storage of only one of these functions. Taking the function of FIG. 6 labeled by a heptagon as an example and assuming that the corresponding, particular span loss is 24 dB, the minimum NF value for this function occurs at approximately 8.0 dB of Raman gain. In other words, the gain balance between the Raman and EDFA amps is 8.0 dB Raman gain and (24 dB–8.0 dB)=16.0 dB EDFA gain.

Once the minimum value of the function is determined (330), controller 50 may then set (340) the Raman pump 40 power to generate Raman gain corresponding to the minimum noise figure.

Continuing the FIG. 6 example above controller 50 would set the Raman pump 40 gain to 8.0 dB. To achieve the target gain of 24 dB for the span, controller finds the difference between the target gain and the Raman gain (24 dB–8.0 dB)=16.0 dB EDFA gain and sets (350) the EDFA pump 20 output power to produce 16.0 dB of gain. The method is then complete as indicated by the end step (360).

FIG. 5 illustrates one way of generating the functions relating the hybrid amp noise figure and Raman gain functions for a plurality of different span losses. After starting (400), the controller 50 operates (410) the EDFA pump 20 preferably at a constant pump power, in saturation and with a flat gain spectrum across the operating wavelengths. Controller 50 then increases the Raman pump 40 power and measures (430) the hybrid amp (90 or 95) performance. The measurement step (430) may be performed by introducing a tap (not shown) in the span downstream of the amplification and measuring the power of the amplified signal.

A loop is formed by increasing (420) Raman pump 40 power, measuring (430) performance, and testing (440) whether the system is finished increasing Raman pump 40 power. If so, then the span loss is changed (450) and the inner loop is repeated until finished (460) changing the span loss. Span loss may be changed manually by connecting the hybrid amp (90 or 95) to different spans 5 or by using a variable optical attenuator to simulate different span losses.

Step 470 then determines the functions each of which relates the noise factor and Raman gain for a particular span loss. These functions may be determined by calculating the noise factor for each measured hybrid amp performance value.

As mentioned above, it is not necessary to calculate a plurality of functions particularly when the span loss is known. In that case, steps 450 and 460 may be skipped and step 470 would determine a single function for the known span loss.

As an alternative to the determining the functions using the measurement scheme of FIG. 5 it is also possible to simulate the hybrid amp (90 or 95) with a computer program and calculate the functions from the computer simulation.

As mentioned above, FIGS. 6–8 are examples of the functions that may be determined by the invention. FIG. 6 shows the case of a hybrid amp (90 or 95) including a 20 dB EDFA and a 10 dB Raman amp. The functions shown in FIG. 6 are for span losses ranging from 20 to 30 dB. The function labeled by a triangle is the function corresponding to a 20 dB span loss. The other functions are as follows: square=21 dB, pentagon=22 db, hexagon=23 dB, heptagon=24 dB, octagon=25 dB, 5 pointed star=26 dB, 6 pointed star=27 dB and diamond=30 dB. The unlabelled functions between the 6 pointed star line and the diamond line correspond to 28 and 29 dB span losses.

FIG. 7 shows the case of a hybrid amp (90 or 95) that includes a 25 dB EDFA and a 10 dB Raman amp. The functions shown in FIG. 7 are for span losses ranging from 25 to 35 dB. The function labeled by a triangle is the function corresponding to a 25 dB span loss. The other functions are as follows: square=26 dB, pentagon=27 db, hexagon=28 dB, heptagon=29 dB and diamond=35 dB. The unlabelled functions between the heptagon line and the diamond line correspond to 30, 31, 32, 33, and 34 dB span losses.

FIG. 8 shows the case of a hybrid amp (90 or 95) that includes a 13 dB EDFA and a 10 dB Raman amp. The functions shown in FIG. 6 are for span losses ranging from 13 to 23 dB. The function labeled by a triangle is the function corresponding to a 13 dB span loss. The other functions are as follows: square=14 dB, pentagon=15 db, hexagon=16 dB, heptagon=17 dB and diamond=23 dB. The unlabelled functions between the heptagon line and the diamond line correspond to 18, 19, 20, 21, and 22 dB span losses.

The line traversing the functions shown in FIG. 6 and denoted by square data points is the optimum control curve for the hybrid amp (90 or 95) that minimizes the noise figure for a plurality of different span losses. Once this control curve is determined, a hybrid amp (90 or 95) may be constructed as shown in FIGS. 1 and 2 that minimizes the noise figure for different span losses. The control curve may be stored in memory device 60 and accessed by controller 50 to control the gain balance between the EDFA pump 20 and Raman pump 40 that minimizes the noise figure. If the span loss is known, then the control curve may be reduced to two set points for the EDFA pump 20 and Raman pump 40.

Although the functions illustrated in FIGS. 6–8 show functions corresponding to integer span loss values, it is possible to derive functions for non-integer span losses such as 20.5 dB.

Furthermore, the functions generated by the invention relate the Raman-EDFA gain balance to the noise figure of the hybrid amp. In other words, it may appear from the labels of FIGS. 6–8 that Raman gain is graphed against noise figure but actually these functions relate the gain balance to noise figure where the Raman portion of the gain balance is the one actually shown in FIGS. 6–8. After all, the EDFA gain is calculated by simply finding the difference between the span loss and Raman gain. Thus, it is considered equivalent and within the scope of the claims to determine the EDFA gain value that minimizes noise figure and then find the difference between span loss and EDFA gain to determine the Raman gain portion of the balance.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of minimizing noise generated by a hybrid amplifier having a rare-earth doped fiber amplifier and a Raman amplifier, comprising:

generating a plurality of functions, each function relating a noise figure of the hybrid amplifier and a Raman gain of the Raman amplifier for a particular span loss;

selecting a span loss value from among the particular span losses;

determining a Raman gain value that minimizes the noise figure of the hybrid amplifier from the function corresponding to the selected span loss value;

controlling the Raman amplifier to amplify an optical signal at the Raman gain value determined by said determining step; and controlling the rare-earth doped fiber amplifier to amplify the optical signal in accordance with the Raman gain value.

2. The method of minimizing noise generated by a hybrid amplifier according to claim 1, said controlling the rare-earth doped fiber amplifier step setting the rare-earth doped fiber amplifier gain to a value related to the difference between the selected span loss value selected by said selecting step and the Raman gain value determined by said determining step.

3. The method of minimizing noise generated by a hybrid amplifier according to claim 1, said generating step generating the functions according to a simulation of the hybrid amplifier with the simulated operation of the rare-earth doped fiber amplifier being at a constant pump power and in saturation.

4. The method of minimizing noise generated by a hybrid amplifier according to claim 1, said generating step including:
operating the rare-earth doped fiber amplifier at a constant pump power and in saturation;
changing the gain of the Raman amplifier;
measuring the hybrid amplifier performance as the gain of the Raman amplifier is changed by said changing step;
iterating said operating, said changing, and said measuring steps for each of a plurality of particular span losses; and
generating the plurality of functions according to the measurements taken by said measuring step.

5. The method of minimizing noise generated by a hybrid amplifier according to claim 1, wherein the rare-earth doped fiber amplifier is an EDFA.

6. A method of minimizing noise generated by a hybrid amplifier having a rare-earth doped fiber amplifier and a Raman amplifier, comprising:

generating a function relating a noise figure of the hybrid amplifier and a Raman gain of the Raman amplifier for a span loss of the span of optical fiber to which the Raman amplifier and the rare-earth doped fiber amplifier are operatively connected;

determining a Raman gain value that minimizes the noise figure of the hybrid amplifier from the function generated by said generating step;

controlling the Raman amplifier to amplify an optical signal at the Raman gain value determined by said determining step; and controlling the rare-earth doped fiber amplifier to amplify the optical signal in accordance with the Raman gain value.

7. The method of minimizing noise generated by a hybrid amplifier according to claim 6, said controlling the rare-earth doped fiber amplifier step setting the rare-earth doped fiber amplifier gain to a value related to the difference between the span loss and the Raman gain value determined by said determining step.

8. The method of minimizing noise generated by a hybrid amplifier according to claim 6, said generating step generating the function according to a simulation of the hybrid amplifier with the simulated operation of the rare-earth doped fiber amplifier being at a constant pump power and in saturation.

9. The method of minimizing noise generated by a hybrid amplifier according to claim 6, said generating step including:
operating the rare-earth doped fiber amplifier at a constant pump power and in saturation;

changing the gain of the Raman amplifier;

measuring the hybrid amplifier performance as the gain of the Raman amplifier is changed by said changing step; and generating the function according to the measurements taken by said measuring step.

10. The method of minimizing noise generated by a hybrid amplifier according to claim 6, wherein the rare-earth doped fiber amplifier is an EDFA.

11. A hybrid amplifier, comprising:

a rare-earth doped fiber amplifier operatively connected to a span of optical fiber;

a Raman pump operatively connected to the span of optical fiber and operating at a wavelength selected to provide Raman gain to an optical signal travelling in the span of optical fiber;

a controller operatively connected to said rare-earth doped fiber amplifier and said Raman pump; and a memory device operatively connected to said controller, said memory device storing a Raman gain value and a rare-earth doped amplifier gain value that minimizes a noise figure of the hybrid amplifier for a span loss of the span of optical fiber to which said Raman pump and said rare-earth doped fiber amplifier are operatively connected;

said controller controlling said Raman pump to provide Raman gain substantially equal to the Raman gain value stored by said memory device;

said controller controlling the rare-earth doped fiber amplifier to provide gain substantially equal to the rare-earth doped amplifier gain value stored by said memory device.

12. The hybrid amplifier according to claim 11, said controller generating a function relating a noise figure of the hybrid amplifier and a Raman gain of said Raman amplifier for a span loss of the span of optical fiber to which said Raman amplifier and said rare-earth doped fiber amplifier are operatively connected;

said controller determining a Raman gain value that minimizes the noise figure of the hybrid amplifier from the generated function;

said controlling determining the rare-earth doped fiber amplifier gain value by finding the difference between the span loss and the determined Raman gain value;

said controller storing the determined Raman gain value and the rare-earth doped fiber amplifier gain value in said memory device.

13. The hybrid amplifier according to claim 11, wherein said rare-earth doped fiber amplifier is an EDFA.

* * * * *